No. 786,538. PATENTED APR. 4, 1905.
R. WALES.
MITER CUTTING MACHINE.
APPLICATION FILED SEPT. 15, 1903.
4 SHEETS—SHEET 1.
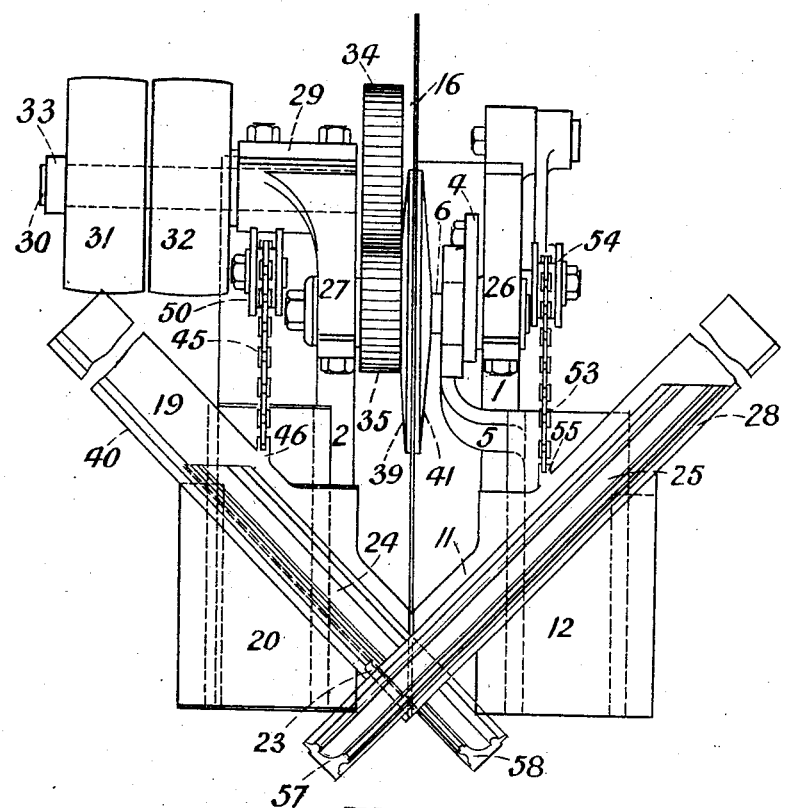
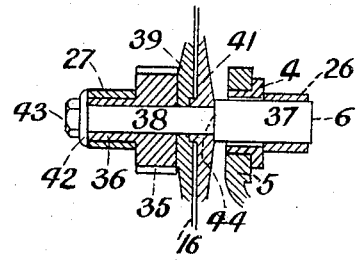

No. 786,538. PATENTED APR. 4, 1905.
R. WALES.
MITER CUTTING MACHINE.
APPLICATION FILED SEPT. 15, 1903.

4 SHEETS—SHEET 2.

No. 786,538. PATENTED APR. 4, 1905.
R. WALES.
MITER CUTTING MACHINE.
APPLICATION FILED SEPT. 15, 1903.

4 SHEETS—SHEET 3.

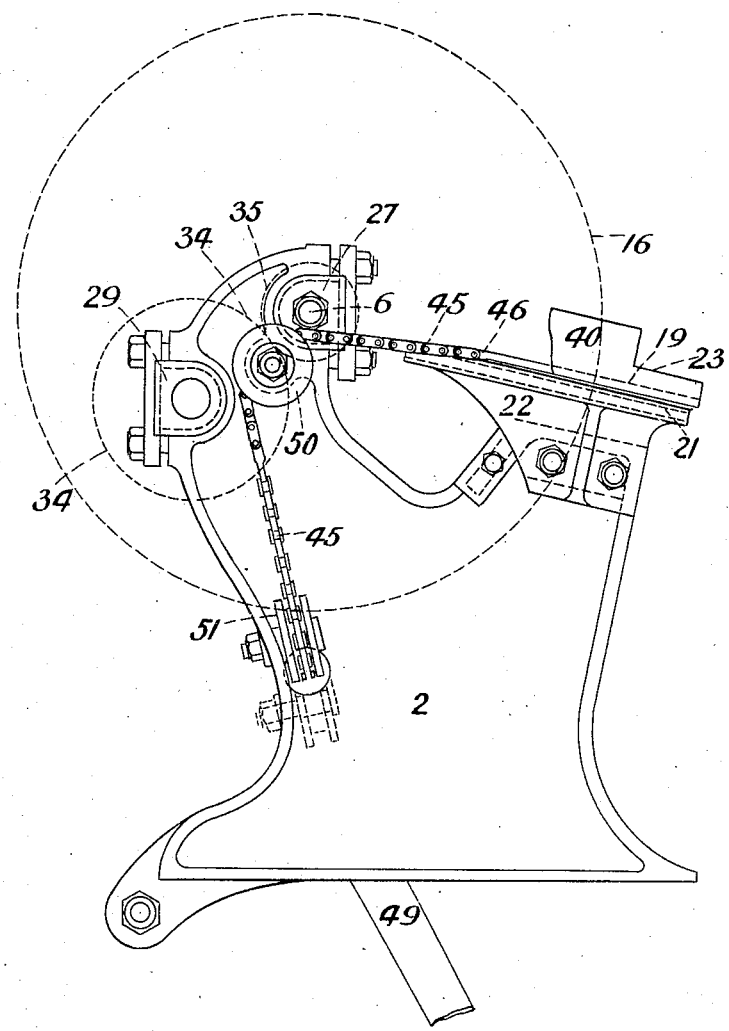

No. 786,538. Patented April 4, 1905.

UNITED STATES PATENT OFFICE.

ROBERT WALES, OF DUNEDIN, NEW ZEALAND.

MITER-CUTTING MACHINE.

SPECIFICATION forming part of Letters Patent No. 786,538, dated April 4, 1905.

Application filed September 15, 1903. Serial No. 173,341.

*To all whom it may concern:*

Be it known that I, ROBERT WALES, engineer, of Dunedin, New Zealand, have invented a certain new and useful Improved Miter-Cutting Machine, of which the following is a specification.

This invention relates to machines by which pieces of material, such as molding and the like, are cut by a circular saw at an angle in order to form a miter or bevel joint when the cut ends of the pieces are joined together.

The leading features of the invention are as follows: There are two rests at an angle with each other on each side of a conveniently located and operated circular saw. The supporting-surface of each rest is in a radial plane passing through the axis of the saw-spindle, one or both of said rests being adapted to move in a circular path round said axis and both rests being mounted so as to have a simultaneous movement in their radial planes toward and from the saw parallel with the plane of the saw. One piece of material is supported on one rest at a desired angle with and crossing above a second piece of material supported on the other rest, so that when the rests are moved toward the saw-spindle the saw commences to cut the two pieces of material at the intersections of their edges simultaneously and traverses and passes out of them simultaneously, so that they may be subsequently joined together at the cut ends to form a miter or bevel joint without any fitting.

Subsidiary features of the invention are the arrangement of the saw-spindle and its bearings for the ready withdrawal of the saw and for reducing its wabbling when in motion.

The invention consists of three features and of the combination and arrangement of parts hereinafter described, and particularly pointed out in the claims.

In the accompanying drawings, illustrating the invention, the same numerals of reference indicate the same or similar parts.

Figure 3:
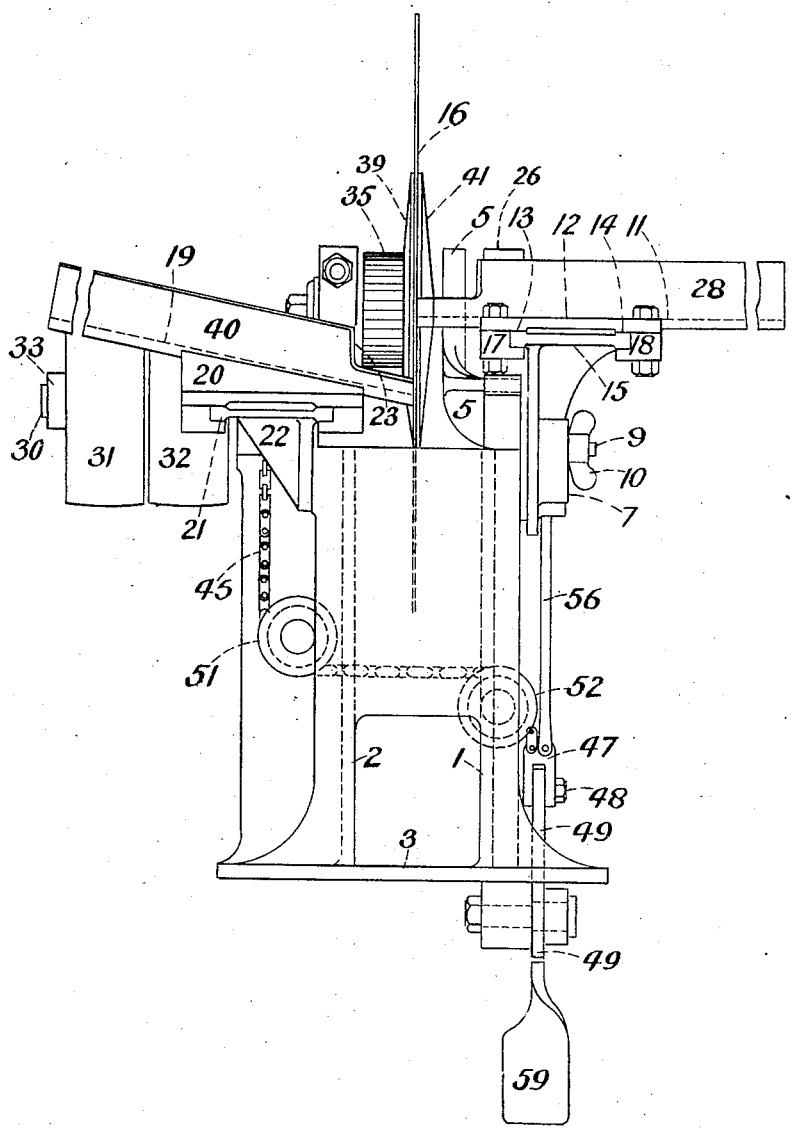
Figure 4:
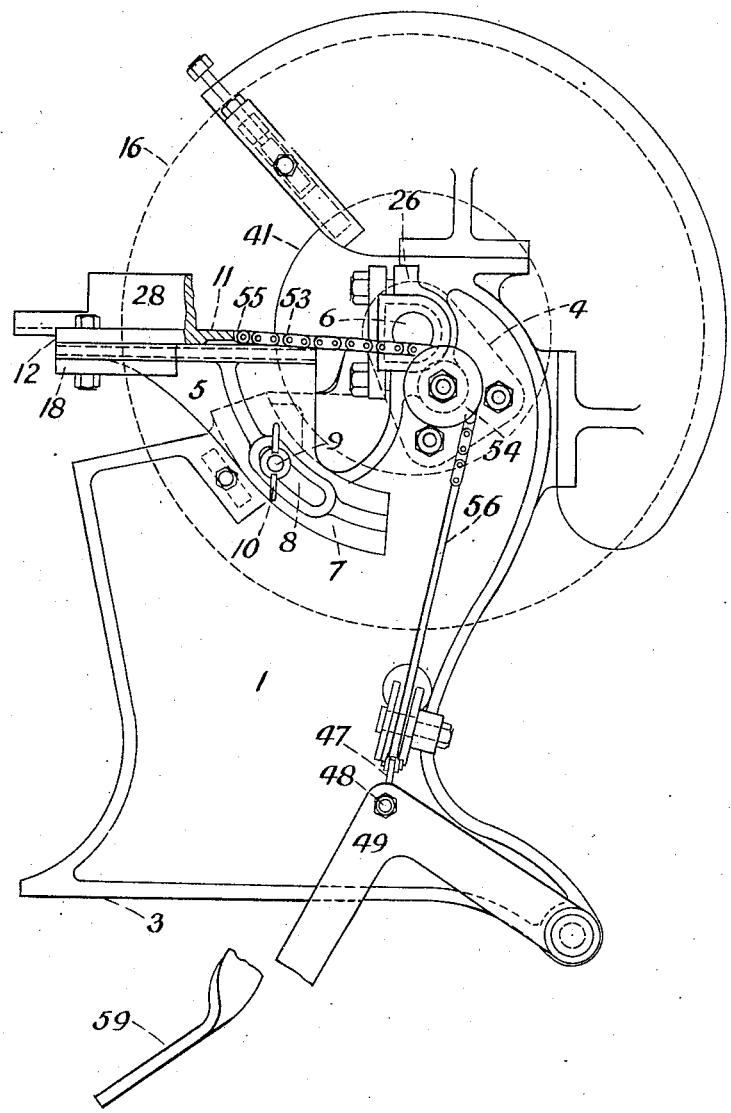

Figure 1 is a plan of the machine. Fig. 2 is a part-sectional view showing the arrangement of the saw-spindle and its bearings. Fig. 3 is a front elevation of the machine. Fig. 4 is a side elevation of the machine from the right, showing one rest adapted to be moved in a circular path. Fig. 5 is a side elevation of the machine from the left.

The main bracket of the machine consists of two cheeks 1 and 2, supported by a base 3. A bracket 4, bolted to the inside of the cheek 1, supports pivotally a guide-bracket 5, which is thus adapted to move in an arc of a circle round the axis of the saw-spindle 6. The guide-bracket 5 has a projecting quadrant 7, provided with a slot 8 engaging a pin 9, studded to the cheek 1 and carrying a wing-nut 10, so that the guide-bracket 5 may be secured in any desired position. A movable molding-rest 11, provided with a back or flange 28, has a lug 12, with its under surface machined and adapted to slide on opposing machined strips 13 14, placed parallel with the plane of the saw on a lug 15, which is integral with the guide-bracket 5. The molding-rest 11 is shown fixed at an angle of forty-five degrees with the plane of the saw 16, and its supporting-surface is in a radial plane passing through the axis of the saw-spindle. It has a parallel movement toward and from the saw by sliding on the machined strips 13 14, and it is prevented from being displaced laterally by guide-bars 17 and 18, which embrace said machined strips and are secured to the lug 12. The molding-rest 11 has also by its connection with the pivotally-supported bracket 5 a movement in an arc of a circle round the axis of the saw-spindle. A second molding-rest 19, provided with a back or flange 40, shown as not movable in a circular path, has a lug 20 attached thereto similar to the lug 12, that is attached to the rest 11. The under surface of the lug 20 is machined and is adapted to slide on opposing machined strips placed parallel with the plane of the saw on a lug 21, integral with a supporting-bracket 22, secured to the outside of the cheek 2. The molding-rest 19 is shown fixed at an angle of forty-five degrees with the plane of the saw 16 and at an angle of ninety degrees with the movable molding-rest 11 and with its supporting-surface in a radial plane passing through the axis of the saw-spindle. The molding-rest 19 has also a parallel movement toward and from the saw, being adapted to slide on the machined strips referred to, and it is prevented from being displaced laterally by guide-bars embracing said strips and secured to the lug 20, as before described in the case of the molding-rest 11. The flange 40 of the molding-rest 19 has a piece cut out of its inner end 23 for the purpose of allowing a molding 25, lying on the movable molding-rest 11, to cross above a molding 24, lying on the molding-rest 19.

The bearings 26 and 27 for the saw-spindle 6, respectively mounted on the cheeks 1 and 2, are provided with the usual brass bushes and covers. A second bearing 29, constructed similarly to the bearings 26 and 27, is attached to the cheek 2 of the main bracket, so that the machine may be driven from the left side. A similar bearing may also be attached in a similar position on the cheek 1, so that the machine may be driven from the right side, if so desired. A spindle 30, supported by the bearing 29, has a pulley 31, adapted to run loose on it, and has also a second pulley, 32, keyed on it. A collar 33 keeps the loose pulley 31 in position. A spur-wheel 34, Fig. 1, is keyed on the inner end of the spindle 30 in a position that will permit it to gear with a pinion 35, which is mounted on and secured to the saw-spindle 6.

The arrangement of the saw-spindle 6 and its bearings is illustrated in Fig. 2 and is as follows: A boss 36, integral with the pinion 35, forms a journal for and is supported by and rotates in the bearing 27. The saw-spindle 6 is formed, preferably, with one portion, 37, of larger diameter than the remaining portion, 38. A saw-collar 39, circular saw 16, a second saw-collar, 41, and pinion 35 are fitted to the portion 38 of the saw-spindle of smaller diameter. The saw-collars 39 and 41, the saw 16, and the pinion 35 are secured, by means of a washer 42 and nut 43, on the end of the saw-spindle against a shoulder 44, formed at the junction of the two portions of the saw-spindle 6. The portion 37 of the saw-spindle of larger diameter forms a journal which is supported by and rotates on the bearing 26. By these arrangements the saw-spindle 6 can be readily withdrawn by removing the nut 43, and the saw can then be taken out for setting or other purposes, and the same saw or one of different diameter can also be readily replaced. The saw is only used a short distance from its circumference by reason of the moldings rapidly approaching each other as the rests are moved toward the saw-spindle, and this permits large collars 39 41 to be used for the purposes of reducing the wabbling of the saw when in motion.

The rests may be moved toward the saw by hand or in order to secure simultaneous movement by the following means: A chain 45 has one of its ends, 46, attached to the molding-rest 19 and its other end attached to a shackle 47, which is secured, by means of the bolt 48, to a foot-lever 49. The chain 45 is supported by and is adapted to slide over pulleys 50, 51, and 52, suitably placed on the cheeks. A second chain, 53, supported by and adapted to slide over a pulley 54, has one of its ends, 55, attached to the molding-rest 11 and its other end attached to a rod 56. The lower end of the rod 56 is secured to the shackle 47.

In operation a molding 24 is placed on the molding-rest 19 with an end 58 projecting past the plane of the saw, and the movable molding-rest 11 is moved in an arc and clamped at such a distance from the molding-rest 19 as will enable a second molding, 25, placed on the rest 11, to pass through the opening 23 at the inner end of the flange of the molding-rest 19 and lie with its end 57 crossing the end 58 of the molding 24. When pressure is put on the foot-piece 59 of the lever 49, the molding-rests will be drawn forward toward the saw simultaneously, with their supporting-surfaces in radial planes passing through the axis of the saw-spindle and also so that any point on either rest will move in a plane parallel to the plane of the saw. The rests may be drawn back by hand to their starting position. By these means the two moldings are cut simultaneously and when removed from the rests may be immediately joined at their cut ends to form a miter or bevel joint without any fitting being necessary.

Having now described my invention, what I claim as new, and desire to secure by Letters Patent, is—

1. In a miter-cutting machine, a support for one molding, a support for another molding at an angle with said first support, said supports having their supporting-surfaces arranged in different radial planes, passing through the axis of a circular saw, said saw being arranged to operate in a plane perpendicular to said supporting-surfaces at their intersection.

2. In a miter-cutting machine, a support for one molding, a support for another molding at an angle with said first support, said supports having their supporting-surfaces arranged in different radial planes, passing through the axis of a circular saw, said saw being arranged to operate in a plane perpendicular to said supporting-surfaces at their intersection and guiding means.

3. In a miter-cutting machine, a circular saw, a support for one molding at an angle with the plane of said saw having its supporting-surface in a radial plane passing through the axis of the spindle of said saw, and a support for another molding at an angle with said first support and on the other side of the plane of said saw with its supporting-surface in a different radial plane also passing through the axis of said spindle, substantially as and for the purposes set forth.

4. In a miter-cutting machine, a circular saw, a support for one molding at an angle with the plane of said saw having its supporting-surface in a radial plane passing through the axis of the spindle of said saw, and a circularly-adjustable support for another molding at an angle with said first support and on the other side of the plane of said saw with its supporting-surface in a different radial plane also passing through the axis of said spindle substantially as and for the purposes set forth.

5. In a miter-cutting machine a circular saw, a support for one molding at an angle with the plane of said saw, a support for another molding arranged at an angle with the first and with said plane, said supports having their supporting-surfaces arranged in different radial planes passing through the axis of the saw-spindle, whereby the end of one molding may be made to cross over the end of the other, said saw being arranged to operate in a plane perpendicularly to the supporting-surfaces at their intersections, substantially as and for the purposes set forth.

6. In a miter-cutting machine a circular saw a support for one molding at an angle with the plane of said saw, a support for another molding arranged at an angle with the first and with said plane, said supports having their supporting-surfaces arranged in different radial planes passing through the axis of the saw-spindle, whereby the end of one molding may be made to cross over the end of the other, said saw being arranged to operate in a plane perpendicularly to the supporting-surfaces at their intersections, one of said supports being adjustable in relation to the other to vary the distance between their supporting-surfaces substantially as and for the purposes set forth.

7. In a miter-cutting machine a circular saw, a support for one molding at an angle with the plane of said saw having its supoprting-surface in a radial plane passing through the axis of the spindle of said saw, a support for another molding at an angle with said first support and on the other side of the plane of said saw with its supporting-surface in a different radial plane also passing through the axis of said spindle, and guiding means for said supports parallel to the plane of said saw substantially as and for the purposes set forth.

8. In a miter-cutting machine, a circular saw, a support for one molding at an angle with the plane of said saw, having its supporting-surface in a radial plane passing through the axis of the spindle of said saw, a circularly-adjustable support for another molding at an angle with said first support and on the other side of the plane of said saw with its supporting-surface in a different radial plane also passing through the axis of said spindle, and guiding means for said supports parallel to the plane of said saw, substantially as and for the purposes set forth.

9. In a miter-cutting machine a circular saw, a support for one molding at an angle with the plane of said saw, a support for another molding arranged at an angle with the first and with said plane, said supports having their supporting-surface arranged in different radial planes passing through the axis of the saw-spindle, whereby the end of one molding may be made to cross over the end of the other said saw being arranged to operate in a plane perpendicularly to the supporting-surfaces at their intersections, and guiding means for said supports parallel to the plane of said saw substantially as and for the purposes set forth.

10. In a miter-cutting machine, a circular saw, a support for one molding at an angle with the plane of said saw, a support for another molding arranged at an angle with the first and with said plane, said supports having their supporting-surfaces arranged in different radial planes passing through the axis of the saw-spindle, whereby the end of one molding may be made to cross over the end of the other, said saw being arranged to operate in a plane perpendicularly to the supporting-surfaces at their intersections, one of said supports being adjustable in relation to the other to vary the distance between their supporting-surfaces, and guiding means for said supports parallel to the plane of said saw substantially as and for the purposes set forth.

11. In a miter-machine a saw-spindle provided with a shoulder, a circular saw mounted on said spindle, a washer between said shoulder and said saw, a boss on said washer adapted to engage a recess in a second washer on the other side of said saw, a pinion resting against said second washer and provided with a boss forming a journal for a bearing, a nut, and a washer on the end of said spindle embracing said boss and its bearing, substantially as and for the purposes set forth.

In witness whereof I have hereunto set my hand in presence of two witnesses.

ROBERT WALES.

Witnesses:
A. S. Park,
J. R. Park.